United States Patent [19]

Cassidy

[11] Patent Number: 4,907,145
[45] Date of Patent: Mar. 6, 1990

[54] SINE WAVE INVERTER

[75] Inventor: David E. Cassidy, Lowell, Mass.

[73] Assignee: Belmont Instrument Corporation, Billerica, Mass.

[21] Appl. No.: 350,313

[22] Filed: May 11, 1989

[51] Int. Cl.⁴ .............................................. H02M 1/12
[52] U.S. Cl. ......................................... 363/41; 363/97
[58] Field of Search ............................ 363/41, 97, 134

[56] References Cited

U.S. PATENT DOCUMENTS

| | | | |
|---|---|---|---|
| 3,657,569 | 4/1972 | Froeschle | 307/275 |
| 3,663,949 | 5/1972 | Froeschle | 323/17 |
| 3,875,496 | 4/1975 | Carsten | 363/97 |
| 3,970,916 | 7/1976 | Kienscherf | 363/41 |
| 4,041,367 | 8/1977 | Gold et al. | 363/97 |
| 4,281,374 | 7/1981 | Archer | 363/41 |
| 4,327,406 | 4/1982 | Ashley | 363/56 |
| 4,456,872 | 6/1984 | Froeschle | 323/286 |
| 4,646,221 | 2/1987 | Sekino et al. | 363/41 |
| 4,649,467 | 3/1987 | Vesee et al. | 363/41 |
| 4,706,180 | 11/1987 | Wills | 363/132 |

Primary Examiner—Patrick R. Salce
Assistant Examiner—Jeffrey Sterrett
Attorney, Agent, or Firm—George W. Neuner; Henry D. Pahl, Jr.

[57] ABSTRACT

In the sine wave inverter disclosed herein the input of a low pass filter is switched at high frequency between positive and negative supply voltages. The switching is controlled by a comparator which is responsive to a composite of signals which include contributions from a sine wave control signal at the same frequency desired for the output and a square wave control signal which is at a frequency substantially higher than the desired output frequency. The filter input voltage is attenuated and phase adjusted to generate a feedback signal having a high frequency component which is substantially in phase with the high frequency control signal. This feedback signal is combined with the sine wave and high frequency square wave control signals to generate the composite of signals which controls the comparator. Accordingly, the duty cycle of the filter input voltage is varied in correspondence with both the sine wave control signal and the loading of the inverter output.

5 Claims, 1 Drawing Sheet

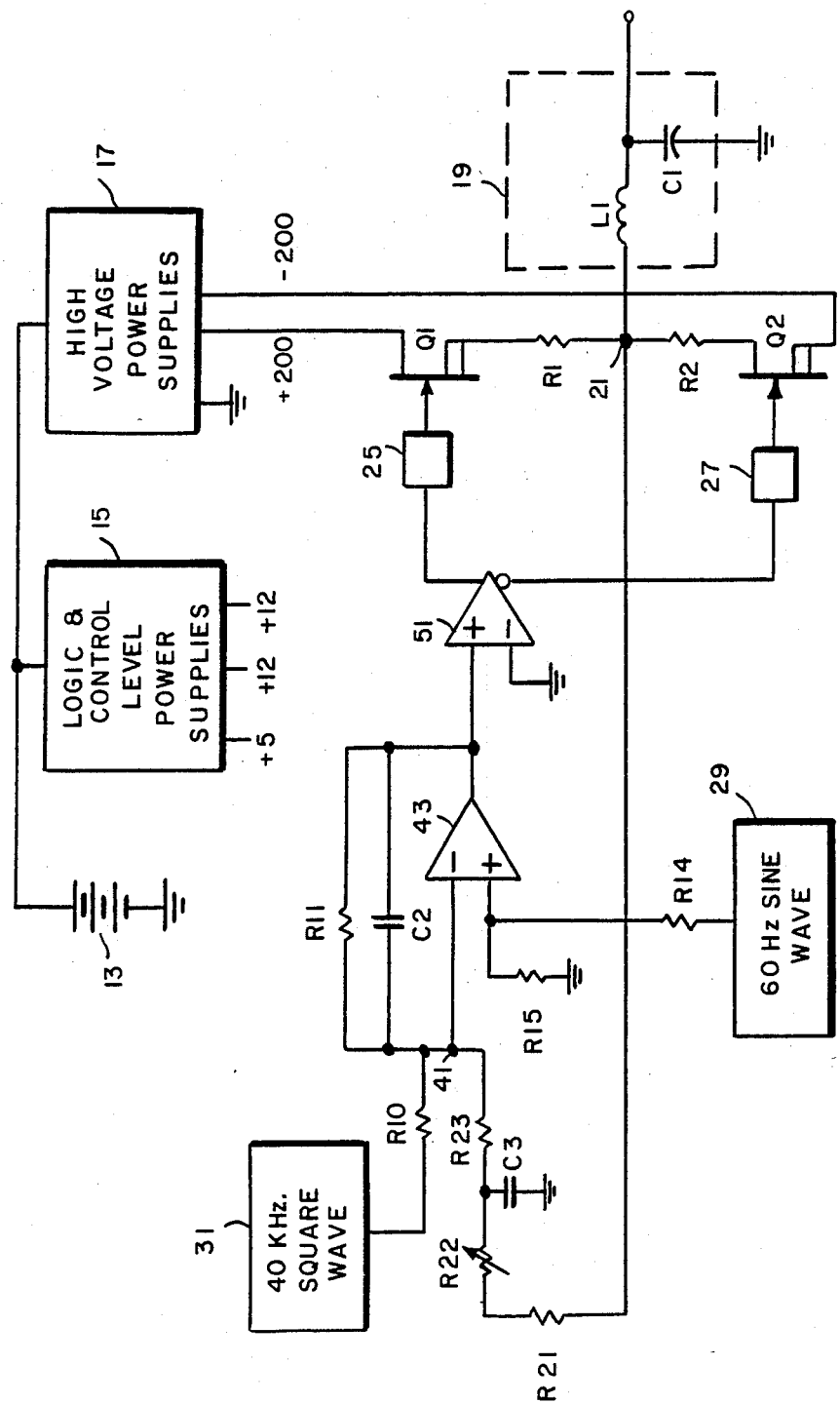

SINE WAVE INVERTER

BACKGROUND OF THE INVENTION

The present invention relates to d.c. to a.c. inverters and more particularly to such inverter which provides a sine wave output waveform.

In certain circumstances, it is desirable to be able to operate a.c. type loads from a source of d.c. power, such as batteries. For example, it may be highly desirable to maintain the operation of various medical devices during failures of the normal supply power distribution system. For this purpose, various rotary and static inverter systems have been heretofore proposed, including designs employing semiconductor switching components.

As is understood by those skilled in the art, most semiconductor or solid state inverters utilize simple square wave switching. While some loads can be driven from such waveforms, others cannot. While various sine wave inverter designs have also been proposed, these typically have not been usable with a wide variety of loads, particularly loads which exhibit low power factors or which draw current unequally from the two halves of the sinusoidal waveform. Further, most sine wave inverter designs proposed heretofore are relatively expensive and complex or produce only a rough approximation of a sine wave and are thus not suitable for all loads.

Among the several objects of the present invention may be noted the provision of a d.c. to a.c. inverter which provides a sine wave output waveform; the provision of such an inverter which will accommodate loads exhibiting a wide range of power factors; the provision of such inverter which will tolerate loads of drawing unequal current from the different phases of the sine wave output voltage; the provision of such an inverter which provides a sine wave output of high accuracy; the provision of such an inverter whose output voltage is highly regulated against variations in both d.c. supply voltage and variation in load; the provision of such an inverter whose operating efficiency is very high; the provision of such an inverter which is of relatively simple and inexpensive construction and which is highly reliable. Other objects and features will be in part apparent and in part pointed out hereinafter.

SUMMARY OF THE INVENTION

Briefly, a d.c. to a.c. sine wave inverter constructed in accordance with the present invention incorporates means for generating a sine wave signal at the desired sine wave output frequency and means for generating a control signal at a frequency substantially higher than the desired sine wave frequency. High speed switching means are provide for selectively connecting the input of a low pass filter to either a positive or a negative supply voltage thereby to generate a filter input voltage. A means responsive to a composite of signals which includes contributions from the high frequency control signal and the sine wave signal operates the switching means at substantially the same frequency as the high frequency controls signal, the duty cycle being variable. The filter input voltage is attenuated and phase adjusted to generate a feedback signal having a high frequency component which is substantially in phase with the high frequency control signal. The high frequency control signal, the sine wave signal and the feedback signal are combined to generate the aforesaid composite of signals thereby to cause the duty cycle of the filter input voltage to vary in correspondence with both the sine wave signal and the loading of the filter output.

BRIEF DESCRIPTION OF THE DRAWINGS

The single FIGURE is a schematic circuit diagram of a d.c. to a.c. sine wave inverter constructed in accordance with the present invention.

DESCRIPTION OF THE PREFERRED EMBODIMENT

Referring now to the drawing, the particular embodiment illustrated there is designed to provide 110 volt sine wave a.c. power to an output terminal 11 while drawing power from a 24 volt battery pack as indicated by reference character 13. Essentially conventional switching mode power supplies are provided as indicated at 15 and 17 for generating, respectively, suitable logic and control level d.c. supply voltages and a pair of high voltage d.c. supply levels of opposite polarity, i.e. positive and negative 200 volts with respect to nominal ground. As will be apparent hereinafter, high voltage supply 17 needs to provide voltages which are well above the peak values of the output sine wave, but these supply voltages do not need to be highly regulated since the inverter itself provides a high degree of regulation as described in greater detail hereinafter.

Sine wave output power is generated by switching the input of a low pass filter 19 between the positive and negative high voltage supplies at high frequency and varying duty cycle, the high frequency components being then removed from the output waveform by the low pass filter 19. In the embodiment illustrated, the low pass filter 19 is implemented by means of a simple series inductor L1 and shunt capacitor C1 as illustrated. The filter input terminal is conveniently designated by reference character 21.

Switching is effected by a pair of high current field effect transistors (FETS) designated by reference characters Q1 and Q2. Series resistors are provided as indicated at R1 and R2 for limiting the instantaneous peak current though these resistors may not be required in all situations. The transistors Q1 and Q2 are driven through suitable optically isolated drivers 25 and 27 which isolate the control circuitry described hereinafter from the high voltage switching circuitry in conventional manner.

The control circuitry utilizes two internally generated control signals, a sine wave at the frequency desired for the output waveform, e.g. 60 Hz., and a square wave at a substantially higher frequency, e.g. 40 kHz. A square wave generator is indicated by reference character 31 and may, for example, comprise a crystal oscillator with appropriate countdown circuitry. The sine wave control signal is appropriately provided by a Wein bridge oscillator 29 though if better output frequency regulation were required a sine wave derived from a crystal controlled oscillator could be used.

The output signal from the square wave generator 31 is applied, through a weighting resistor R10 to a summing junction designated by reference character 41. Summing junction 41 is connected to the inverting input terminal of an operational amplifier 43 which is configured to provide an integrating function by means of a capacitor C2 connecting the amplifier output terminal to the junction 41. Capacitor C2 is shunted by a resistor R11 which provided d.c. stabilizing feedback in conventional manner.

As will be understood by those skilled in the art, integration of the square wave signal will produce a waveform of generally triangular configuration. The output terminal of the operational amplifier 43 is also connected to the input terminal of a comparator 51, the other input of the comparator being grounded. As will also be understood by those skilled in the art, the triangular component of the output amplifier 43 will cause the comparator to switch between states at a frequency equal to the square wave frequency. The duty cycle of the switching, however, can be changed by varying the nominal d.c. voltage of the triangular waveform, i.e. by adding in a low frequency component. The comparator 51 is configured to provide inverted and noninverted output signals which are applied, respectively, to the opto isolated drivers 25 and 27 which control the switching transistors Q1 and Q2 so that the transistors conduct alternately.

The sine wave signal obtained from the oscillator 29 is applied, through a weighting resistor R14 to the noninverting input terminal of amplifier 43 and this component influences the duty cycle of switching to vary sinusoidally.

In addition to the sine wave control signal and the square wave control signal, the inverter of the present invention also employs a feedback signal in generating the composite of signals which controls the duty cycle of switching. This feedback signal is derived by attenuating and phase adjusting the waveform which is produced at the input terminal 21 of the low pass filter 19. Attenuation is provided by fixed and variable resistors R21 and R22 with phase shifting being provided by a shunt capacitor C3. This feedback signal is applied, through a weighting resistor R23 to the summing junction 41.

The amount of phase shifting of the feedback signal with respect to the wave form at the filter input terminal 21 is selected, so that the high frequency a.c. component of the feedback signal is substantially in phase with the 40 kilohertz square wave signal from the generator 31. It is an important feature of the present invention that the feedback signal is derived directly from the switching devices rather than from the filtered wave form present at the output terminal 11. It is further significant that the high frequency component in the feedback signal is preserved and employed in generating the composite of input signals which control the operation of the comparator 51 which in turn controls the duty cycle of the output wave form.

In explaining the operation of the inverter of the present invention, it is useful initially to ignore the effect of the feedback signal. In the simplified case, the square wave is in effect integrated to a triangle wave and the triangle wave is carried by or based with reference to the sine wave provided by the generator 29. Thus, as the triangular wave is carried positive or negative by the sine wave, the timing of switching by the comparator 51 is shifted so as to increase or decrease the duty cycle of the output waveform causing the average voltage at the output of the filter 19 to go positive or negative at the sine wave frequency. Since the high frequency components are removed by the low pass filter 19, the output signal is essentially a sine wave at the frequency determined by the sine wave generator 29. The addition of the feedback signal into the composite of signals which controls comparator switching increases the accuracy with which the output wave form follows a sinusoid, reduces the effect of loading on the output voltage and, reduces the effect of variation in supply or input voltage, e.g. due to variation in the voltage provided by the battery 13 and or the lack of tight regulation in the high voltage power supply 17. Further, since the feedback action utilizes a mixing or composite of the 40 kilohertz components of the initial square wave and of the feedback signal, the regulation itself is very fast and is believed to produce the relative insensitivity to power factor variations and asymmetric loading which are an advantageous characteristics of the inverter of the present invention.

In view of the foregoing it may be seen that several objects of the present invention are achieved and other advantageous results have been obtained.

As various changes could be made in the above constructions without departing from the scope of the invention, it should be understood that all matter contained in the above description or shown in the accompanying drawings shall be interpreted a illustrative and not in a limiting sense.

What is claimed is:

1. A d.c. to a.c. sine wave inverter comprising:
   means for providing a sine wave control signal at the desired output frequency;
   means for providing a control signal at a frequency substantially higher than the desired sine wave frequency;
   a low pass filter having an input and an output;
   means for providing positive and negative supply voltages;
   high speed switching means for selectively connecting said filter input to either said positive or said negative supply voltage thereby to generate a filter input voltage;
   means responsive to a composite of signals which includes contributions from said high frequency control signal and said sine wave control signal for operating said switching means at substantially the same frequency as said high frequency control signal with a duty cycle which varies as a function of the sine wave control signal;
   means for attenuating and phase adjusting said filter input voltage thereby to generate a feedback signal having a high frequency component which is substantially in phase with said square wave signal; and
   means for combining said high frequency signal, said sine wave signal and said feedback signal to generate said composite of signals thereby to cause the duty cycle of said filter input voltage to vary in correspondence with said sine wave signal and the loading of said filter output.

2. An inverter as set forth in claim 1 wherein said higher frequency control signal is a square wave and said means responsive to a composite of signals provides an integrating function.

3. A d.c. to a.c. sine wave inverter comprising:
   means for providing a sine wave control signal at the desired sine wave output frequency;
   means for providing a control signal at a frequency substantially higher than the desired sine wave frequency;
   a low pass filter having an input and an output;
   means for providing positive and negative supply voltages;

high speed switching means for selectively connecting said filter input to either said positive or said negative supply voltage thereby to generate a filter input voltage;

integrator means responsive to a composite of signals which includes a contribution from said higher frequency control signal for generating a waveform having a generally triangular configuration;

comparator means responsive to said triangular waveform for operating said switching means at substantially the same frequency as said square wave control signal;

means for combining said sine wave control signal with said triangular waveform thereby to vary the duty cycle of said comparator and said switching means; and means for attenuating and phase adjusting said filter input voltage thereby to generate a feedback signal having a high frequency component which is substantially in phase with said square wave signal, said feedback signal and said square wave control signal being combined for application to said integrator means thereby to cause the duty cycle of said filter input voltage to vary in correspondence with said sine wave signal and the loading of said filter output.

4. A d.c. to a.c. sine wave inverter comprising:

means for providing a sine wave control signal at the desired sine wave output frequency;

means for providing a square wave control signal at a frequency substantially higher than the desired output frequency;

a low pass filter comprising a series inductor and a shunt capacitor;

means for providing positive and negative supply voltages at levels greater then the peak values of the desired sine wave output from the inverter;

first high speed semiconductor switching means for selectively connecting the input of said filter to said positive supply voltage thereby;

second high speed semiconductor switching means for selectively connecting the input of said filter to said negative supply voltage;

means for driving said first and second switching means alternately thereby to generate a filter input voltage;

integrator means responsive to a composite of signals which includes a contribution from said square wave control signal thereby to generate a triangular waveform;

comparator means controlled by said integrator means for operating said driving means at substantially the same frequency as said square wave control signal;

means for combining said sine wave control signal and said triangular waveform thereby to vary the duty cycle of said comparator; and means for attenuating and phase adjusting said filter input voltage thereby to generate a feedback signal having a high frequency component which is substantially in phase with said square wave signal, said feedback signal and said square wave signal being combined for application to said integrator means thereby to cause the duty cycle of said filter input voltage to vary in correspondence with said sine wave signal and the loading of said filter output.

5. An inverter as set forth in claim 4 wherein output frequency is in the order of 60 Hz and the frequency of said square wave is in the order of 40,000 Hz.

* * * * *